(12) United States Patent
Ishihara et al.

(10) Patent No.: US 10,316,717 B2
(45) Date of Patent: Jun. 11, 2019

(54) REDUCING AGENT INJECTION DEVICE AND EXHAUST GAS TREATMENT METHOD

(71) Applicant: NGK INSULATORS, LTD., Nagoya (JP)

(72) Inventors: Takuya Ishihara, Nagoya (JP); Yoshimasa Omiya, Nagoya (JP); Katsumi Saiki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/458,070

(22) Filed: Mar. 14, 2017

(65) Prior Publication Data

US 2017/0284256 A1 Oct. 5, 2017

(30) Foreign Application Priority Data

Mar. 30, 2016 (JP) .................... 2016-068911

(51) Int. Cl.
| | |
|---|---|
| *F01N 3/20* | (2006.01) |
| *B01D 53/90* | (2006.01) |
| *B01D 53/94* | (2006.01) |
| *F01N 3/28* | (2006.01) |

(52) U.S. Cl.
CPC .......... *F01N 3/2066* (2013.01); *B01D 53/90* (2013.01); *B01D 53/9418* (2013.01); *B01D 53/9431* (2013.01); *F01N 3/2026* (2013.01); *B01D 2251/2062* (2013.01); *B01D 2251/2067* (2013.01); *B01D 2255/2092* (2013.01); *B01D 2255/20723* (2013.01); *B01D 2255/20761* (2013.01); *B01D 2255/50* (2013.01); *B01D 2255/808* (2013.01); *B01D 2255/904* (2013.01); *B01D 2257/404* (2013.01); *B01D 2258/012* (2013.01); *F01N 3/2842* (2013.01); *F01N 2610/02* (2013.01); *F01N 2610/1453* (2013.01); *Y02T 10/24* (2013.01); *Y02T 10/26* (2013.01)

(58) Field of Classification Search
None
See application file for complete search history.

(56) References Cited

U.S. PATENT DOCUMENTS 5,628,975 A * 5/1997 Horiuchi .............. B01D 53/944
423/212
2016/0017777 A1 1/2016 Kasai et al.

FOREIGN PATENT DOCUMENTS

| JP | 2007-327377 A1 | 12/2007 | |
|---|---|---|---|
| WO | 2014/148506 A1 | 9/2014 | |
| WO | WO-2014148506 A1 * | 9/2014 | ............. B01D 53/90 |

* cited by examiner

*Primary Examiner* — Walter D. Griffin
*Assistant Examiner* — Jelitza M Perez
(74) *Attorney, Agent, or Firm* — Burr & Brown, PLLC

(57) ABSTRACT

A reducing agent injection device includes a honeycomb structure and a urea spraying device spraying a urea water solution in mist form. A pair of electrode members is formed in the honeycomb structure. The honeycomb structure of the reducing agent injection device, the hydraulic diameter HD, defined as HD=4×S/C, when the area of the cross section of one of the cells in the cross section perpendicular to the cell extending direction is S, and the peripheral length of the cross section of one of the cells is C, is 0.8 to 2.0 mm. Also, the open frontal area OFA of the honeycomb structure in the cross section perpendicular to the cell extending direction is 45 to 80%.

2 Claims, 2 Drawing Sheets

REDUCING AGENT INJECTION DEVICE AND EXHAUST GAS TREATMENT METHOD

The present application is an application based on JP-2016-068911 filed on Mar. 30, 2016 with Japan Patent Office, the entire contents of which are incorporated herein by reference.

BACKGROUND OF THE INVENTION

Field of the Invention

The present invention relates to a reducing agent injection device to purify exhaust gas, and an exhaust gas treatment device.

Description of the Related Art

Conventionally, a selective catalytic reduction type $NO_X$ catalyst (an SCR catalyst) has been used to purify nitrogen oxides ($NO_X$) in the exhaust gas discharged from various kinds of engines and the like (for example, see Patent Document 1).

The exhaust gas purifying device described in Patent Document 1 has a catalyst (an SCR catalyst) mounted on an exhaust pipe of an engine and means for injecting urea water into the exhaust pipe between the engine and the catalyst. Moreover, a plurality of urea water injection means, which mixes the urea water and the exhaust gas, and mixes the urea water with the exhaust gas while causing the urea water to react with a specific component in the exhaust gas by the catalyst, are provided in a plurality of places.

Because the exhaust gas purifying device described in Patent Document 1 decomposes the urea water by heat of the exhaust gas (necessary to be 200° C. or more), there has been a problem that urea is less likely to react when the temperature of the exhaust gas lowers due to improvement of fuel consumption of the engine and the like.

Therefore, an exhaust gas treatment device that promotes a decomposition of urea to $NH_3$, by adding urea to an electrically heated honeycomb structure (honeycomb heater) has been suggested (Patent Document 2). $NO_X$ purification becomes possible also in the low temperature region of the exhaust gas by adding to a pipe as $NH_3$ gas.

[Patent Document 1] JP-A-2007-327377
[Patent Document 2] WO 2014/148506

SUMMARY OF THE INVENTION

However, when urea is added to an electrically heated honeycomb structure (honeycomb heater), the temperature of a portion to which urea is added is lowered, and temperature unevenness in the honeycomb heater occurs. Therefore, there has been a concern that urea deposit (deposit: crystal caused by urea) is formed at a low-temperature section. When urea deposit is generated, the path of the honeycomb heater is cut, and decomposition of urea to $NH_3$ is inhibited, thus it leads to a functional loss.

Urea deposit tends to depend on the temperature of the honeycomb heater when urea is added, thus increase in energizing power is effective for suppressing urea deposit. However, when the amount of urea added is increased, the temperature of the honeycomb heater is further lowered, and high electric power is necessary, thus the temperature distribution in the honeycomb heater also becomes larger, and it leads to breakage of the honeycomb heater.

An object of the present invention is to provide a reducing agent injection device that can suppress urea deposit, in an exhaust gas treatment device that promotes decomposition of urea to $NH_3$, by adding urea to an electrically heated honeycomb structure (honeycomb heater), and an exhaust gas treatment device provided therewith.

In order to solve the above problem, according to the present invention, the following reducing agent injection device, and exhaust gas treatment device are provided.

According to a first aspect of the present invention, a reducing agent injection device is provided, including: a honeycomb structure that has a pillar-shaped honeycomb structure body having partition walls defining and forming a plurality of cells which is through channels of a fluid and extends from a first end face being an end face on an inflow side of the fluid to a second end face being an end face on an outflow side of the fluid, and that has at least a pair of electrode members arranged in a side surface of the honeycomb structure body; and a urea spraying device that sprays a urea water solution in mist form, wherein each of the pair of electrode members is formed in a band shape extending to a cell extending direction of the honeycomb structure body, and one electrode member of the pair of electrode members is arranged on an opposite side of the other electrode member of the pair of electrode members with respect to a center of the honeycomb structure body sandwiched by the pair of electrode members, in the cross section perpendicular to the cell extending direction, the hydraulic diameter HD, defined as $HD=4 \times S/C$, when the area of the cross section of one of the cells in the cross section perpendicular to the cell extending direction is S, and the peripheral length of the cross section of one of the cells is C, is 0.8 to 2.0 mm, the open frontal area OFA of the honeycomb structure in the cross section perpendicular to the cell extending direction is 45 to 80%, and the urea water solution sprayed from the urea spraying device is supplied into the cells from the first end face of the honeycomb structure body, and urea in the urea water solution supplied into the cells is heated and hydrolyzed in the electrically heated honeycomb structure body to generate ammonia, and the ammonia is discharged outside the honeycomb structure body from the second end face and is injected outside.

According to a second aspect of the present invention, an exhaust gas treatment device, including: an exhaust pipe that flows an exhaust gas containing $NO_X$; the reducing agent injection device as defined in the item according to the first aspect that injects the ammonia into the exhaust pipe; and an SCR catalyst arranged on a downstream side of the exhaust pipe with respect to a position where the ammonia is injected.

According to the reducing agent injection device of the present invention, the urea water solution sprayed by the urea spraying device is supplied into the cell of the honeycomb structure. Then, the urea in the urea water solution is heated and hydrolyzed in the electrically heated honeycomb structure to generate ammonia, and the generated ammonia is injected. The reducing agent injection device of the present invention does not cause clogging of cells of a honeycomb structure by urea deposit (also simply referred to as deposit) by setting the open frontal area OFA of the honeycomb structure and the hydraulic diameter HD within predetermined ranges.

According to the exhaust gas treatment device of the present invention, because the reducing agent injection device of the present invention described above is included, ammonia can be generated from the urea water solution with less energy even when the exhaust gas is at low temperature.

DESCRIPTION OF THE PREFERRED EMBODIMENTS

Hereinbelow, the embodiments of the present invention are described in reference to the drawings. The present invention is not limited to the following embodiments, and a change, modification and improvement may be added without departing from the scope of the invention.

Figure 1:
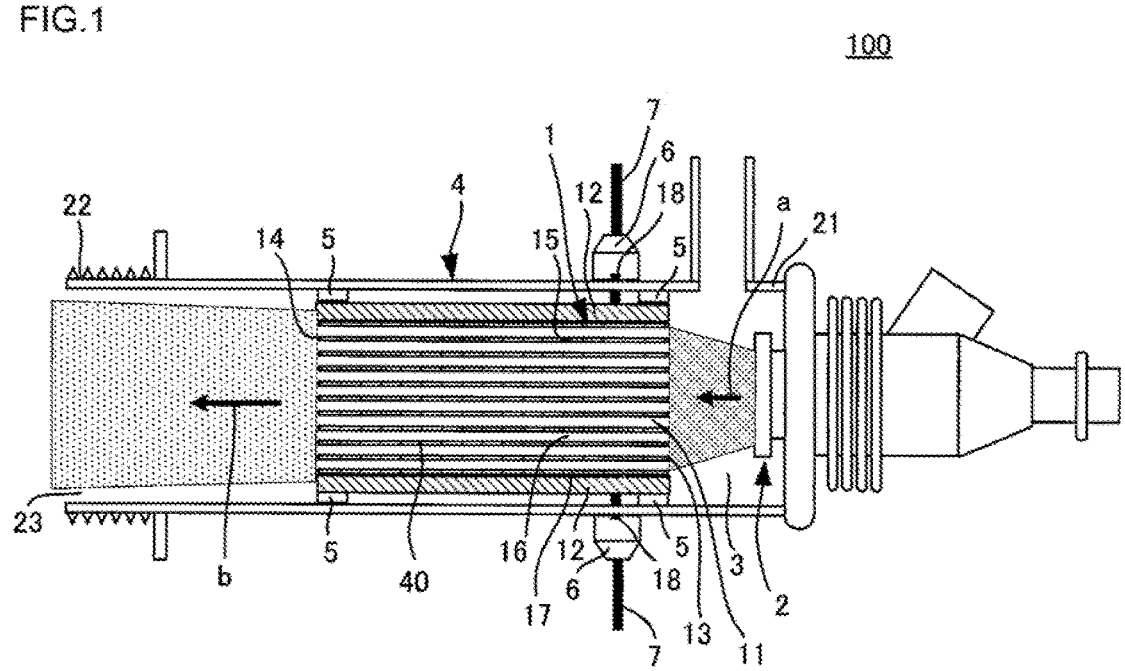
FIG. 1 is a schematic diagram showing a cross section of one embodiment of a reducing agent injection device of the present invention.

(1) Reducing Agent Injection Device:

FIG. 1 is a schematic diagram showing a cross section (cross section parallel to a cell 16 extending direction of a honeycomb structure body 11) of one embodiment of a reducing agent injection device 100 of the present invention. As shown in FIG. 1, one embodiment of the reducing agent injection device 100 of the present invention includes the honeycomb structure 1 (also referred to as honeycomb heater) and a urea spraying device 2 spraying a urea water solution in mist form. The honeycomb structure 1 has a pillar-shaped honeycomb structure body 11 and a pair of electrode members 12 and 12 arranged in a side surface of the honeycomb structure body 11. The honeycomb structure body 11 has "partition walls 15 defining and forming "a plurality of cells 16 which is through channels of a fluid and extends from a first end face 13 being an end face on an inflow side of the fluid to a second end face 14 being an end face on an outflow side of the fluid."" Each of the pair of electrode members 12 and 12 is formed in a band shape extending in the cell 16 extending direction of the honeycomb structure body 11. In a cross section perpendicular to the cell 16 extending direction, one electrode member 12 of the pair of electrode members 12 and 12 is arranged on an opposite side of the other electrode member 12 of the pair of electrode members 12 and 12 sandwiching a center of the honeycomb structure body 11. The electrode member 12 is constituted by at least one pair, and may be constituted by plural pairs for improving heat generating efficiency of a heater.

The honeycomb structure 1 of the reducing agent injection device 100, the hydraulic diameter HD, defined as HD=4×S/C, when the area of the cross section of one of the cells 16 in the cross section perpendicular to the cell 16 extending direction is S, and the peripheral length of the cross section of one of the cells 16 is C, is 0.8 to 2.0 mm. Also, the open frontal area OFA of the honeycomb structure 1 in the cross section perpendicular to the cell 16 extending direction is 45 to 80%. The open frontal area OFA is a value calculated as the ratio of the opening area of cells to the total cross sectional area (containing circumferential walls and opening portions of cells, not containing electrode members) of the cross section perpendicular to the cell 16 extending direction of the honeycomb structure 1. The hydraulic diameter HD is more preferably 0.9 to 1.9 mm, and further preferably 1.0 to 1.7 mm. Also, the open frontal area OFA is more preferably 50 to 80%, and further preferably 60 to 80%. Clogging of cells 16 by urea deposit can be prevented by setting the hydraulic diameter and open frontal area within above ranges.

When the exhaust gas temperature is low, a honeycomb heater (honeycomb structure 1) is electrically heated. In this case, when the open frontal area OFA is larger than 80%, a heat generation part of the honeycomb heater is small, and a heater output is lowered. Then, urea cannot be sufficiently decomposed, and urea deposit is likely to be generated. On the other hand, when the open frontal area OFA is smaller than 45%, heat capacity of the honeycomb heater becomes large, and the honeycomb heater tends to be low temperature due to power shortage. Then, urea cannot be sufficiently decomposed, and urea deposit is likely to be generated. When power is increased, the honeycomb heater is likely to be broken.

Also, when the honeycomb heater (honeycomb structure 1) is electrically heated, in a hydraulic diameter HD of larger than 2.0 mm, blow-by of urea is likely to occur, and the generation amount of ammonia is likely to decrease. Namely, the urea decomposition efficiency is likely to be lowered. Therefore, when the hydraulic diameter is 2.0 mm or less, blow-by of urea is likely to be reduced, and the urea decomposition efficiency is improved.

When the exhaust gas temperature is high a honeycomb heater (honeycomb structure 1) is not electrically heated. In this case, the open frontal area does not much affect the urea decomposition efficiency. Also, when the honeycomb heater (honeycomb structure 1) is not electrically heated, in a large hydraulic diameter, the urea permeability is improved, and there is no problem. On the other hand, when the hydraulic diameter is small, urea remains in the honeycomb heater, and urea crystal deposits easily to evaporate moisture. Based on the above, in order to suppress urea deposit and improve function of the reducing agent injection device 100, it is preferable to set the open frontal area to 45 to 80% and the hydraulic diameter to 0.8 to 2.0 mm.

In the reducing agent injection device 100 of the embodiment, a urea water solution a sprayed from the urea spraying device 2 is supplied into the cell 16 from the first end face 13 of the honeycomb structure body 11. Then, urea in the urea water solution supplied into the cell 16 is heated and hydrolyzed in the electrically heated honeycomb structure body 11 to generate ammonia (reducing agent). Moreover, ammonia b is discharged outside the honeycomb structure body 11 from the second end face 14.

In the reducing agent injection device 100 of the embodiment, a raw material for generation of ammonia is the urea water solution. Therefore, a urea water solution distributed on the market (for example, AdBlue (a urea water solution of 32.5% by mass: a registered trademark of the German Automotive Industry Association (VDA)) can be used. Accordingly, it is also highly convenient in terms of procurement of a urea water solution as a raw material for generation of ammonia.

In the reducing agent injection device 100 of the embodiment, the honeycomb structure 1 is housed in a tubular outer cylinder 4. The honeycomb structure 1 is secured inside the outer cylinder 4 by the insulation supporting portion 5.

Figure 2:
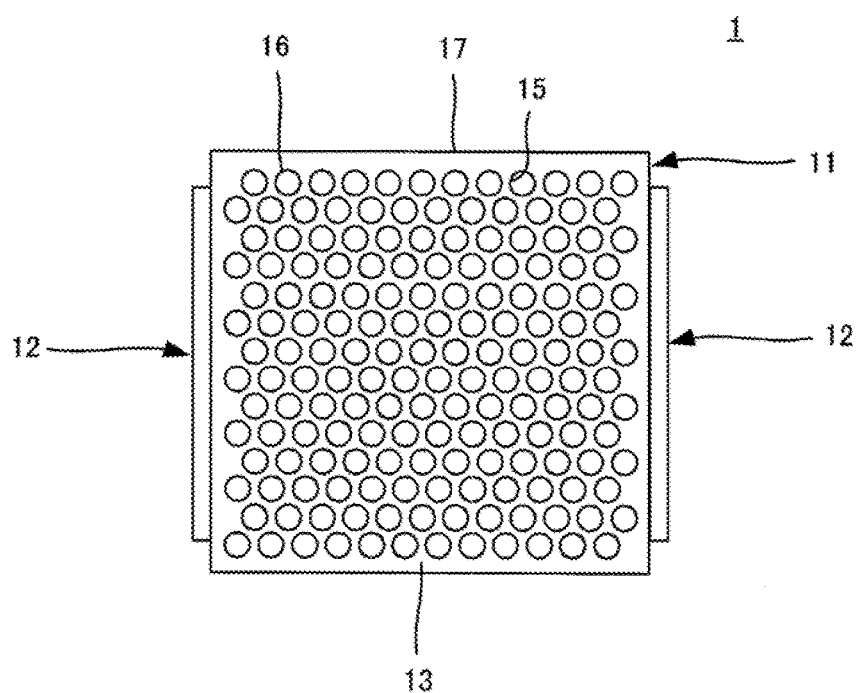
FIG. 2 is a plane view schematically showing an end face of a honeycomb structure constituting one embodiment of a reducing agent injection device of the present invention.

As shown in FIG. 2, in the honeycomb structure 1, the shape of the first end face 13 of the honeycomb structure body 11 is preferably square. The shape of the first end face 13 is not limited to a square shape, and may be a rectangular shape, other polygonal shape, a round shape or an oval shape or the like. The shape of the first end face 13 is the same as that of the second end face 14, and further preferably also the same as that of a cross section, which is perpendicular to the cell 16 extending direction of the honeycomb structure body 11.

In addition, a urea spraying space 3 is preferably formed between the first end face 13 of the honeycomb structure body 11 and the urea spraying device 2. The urea spraying space 3 is a space formed by the first end face 13 of the honeycomb structure 1, the urea spraying device 2, and the outer cylinder 4. In the reducing agent injection device 100 of the embodiment, when the urea spraying space 3 is formed, the urea water solution a sprayed from the urea spraying device 2 is supplied into the cell 16 from the first end face 13 of the honeycomb structure body 11 through the urea spraying space 3.

The outer cylinder 4 has a tubular shape having the inlet side end portion 21 as one end portion and the outlet side end portion 22 as the other end portion. At a distal end of the outlet side end portion 22, the injection port 23 as an open end for injection of the ammonia gas is formed. Inside the inlet side end portion 21 of the outer cylinder 4, the urea spraying device 2 is mounted. The material of the outer cylinder 4 is preferably stainless steel and the like.

The honeycomb structure 1 is secured (held) inside the outer cylinder 4 by the insulation supporting portion 5. This ensures insulation between the honeycomb structure 1 and the outer cylinder 4. The material of the insulation supporting portion 5 is preferably alumina. There may be a portion (space), where the insulation supporting portion 5 is not arranged, between the honeycomb structure 1 and the outer cylinder 4. Also, the whole outer circumference of the honeycomb structure 1 may be covered by the insulation supporting portion 5.

The reducing agent injection device 100 of the embodiment is configured such that the ammonia discharged from the second end face 14 of the honeycomb structure 1 is injected from the injection port 23 through the inside of the outlet side end portion 22 of the outer cylinder 4.

The following further describes the reducing agent injection device 100 of the embodiment by respective constituent components.

(1-1) Honeycomb Structure:

In the reducing agent injection device 100 of the embodiment, the honeycomb structure 1 includes the honeycomb structure body 11 and the pair of electrode members 12 and 12, as described above. The honeycomb structure 1 has partition walls 15 defining and forming "a plurality of cells 16 which is through channels of a fluid and extends from a first end face 13 to a second end face 14".

In the honeycomb structure body 11, a circumferential wall 17 is arranged outside the partition wall 15. In the honeycomb structure body 11, the material of the partition wall 15 and the circumferential wall 17 is preferably ceramic. Especially, the material of the partition wall 15 and the circumferential wall 17 preferably contains a "silicon-silicon carbide composite material", "silicon carbide" and the like as a main component. Among these, the material further preferably contains a "silicon-silicon carbide composite material" as a main component. By using such materials, it becomes easier to adjust electrical resistivity of the honeycomb structure body 11 to any value by change of a ratio of silicon carbide to silicon. Here, the silicon-silicon carbide composite material contains silicon carbide particles as aggregates and metal silicon as a bonding material for bonding the silicon carbide particles. In the silicon-silicon carbide composite material, a plurality of silicon carbide particles is preferably bonded by metal silicon. The above-described "silicon carbide" is formed by the silicon carbide particles sintered together. The "main component" herein means the component occupying 90% by mass or more.

The electrical resistivity of the honeycomb structure body 11 is preferably from 0.01 Ωcm to 500 Ωcm, and is further preferably from 0.1 Ωcm to 200 Ωcm. This allows causing the honeycomb structure 1 (honeycomb structure body 11) to effectively generate heat by application of voltage to the pair of electrode members 12 and 12. Especially, the above-described electrical resistivity preferably causes the honeycomb structure 1 (honeycomb structure body 11) to generate heat to 160° C. to 600° C. by use of a power source with voltages of 12 V to 200 V. The electrical resistivity of the honeycomb structure body 11 is a value at 25° C. The electrical resistivity of the honeycomb structure body 11 is the value measured by a four-terminal method.

In the honeycomb structure body 11, the surface area per unit volume is preferably 5 $cm^2/cm^3$ or more, further preferably from 8 $cm^2/cm^3$ to 45 $cm^2/cm^3$, and especially preferably from 20 $cm^2/cm^3$ to 40 $cm^2/cm^3$. When the surface area per unit volume is smaller than 5 $cm^2/cm^3$, a contact area with urea water becomes smaller, so that the treatment rate of the urea water solution, namely the generation amount (generation rate) of ammonia may decrease. The surface area of the honeycomb structure body 11 is the area of the surface of the partition wall 15 of the honeycomb structure body 11.

In the honeycomb structure 1 (honeycomb structure body 11), the thickness of the partition wall 15 is preferably from 0.06 mm to 1.5 mm, and further preferably from 0.10 mm to 0.80 mm. When the thickness of the partition wall 15 is thicker than 1.5 mm, the pressure loss becomes larger, and the treatment rate of the urea water solution, namely the generation amount (generation rate) of ammonia may decrease. When the thickness of the partition wall 15 is thinner than 0.06 mm, it may be broken by thermal shock by energization. When the shape of the cell 16 (the shape perpendicular to the cell extending direction) is a round shape, the thickness of the partition wall 15 means the thickness of the partition wall 15 for "a portion where the distance between the cells is shortest (the portion where the partition wall 15 is thinnest)." The cell density is preferably from 7 $cells/cm^2$ to 140 $cells/cm^2$, and further preferably from 15 $cells/cm^2$ to 120 $cells/cm^2$. When the cell density is smaller than 7 $cells/cm^2$, the contact area with urea water becomes smaller, so that the treatment rate of the urea water solution, namely the generation amount (generation rate) of the ammonia may decrease. When the cell density is larger than 140 $cells/cm^2$, the pressure loss becomes larger, and the treatment rate of the urea water solution, namely the generation amount (generation rate) of ammonia may decrease.

As to the size of the honeycomb structure 1, the area of the first end face 13 (the second end face 14) is preferably from 50 $mm^2$ to 10000 $mm^2$, and further preferably 100 $mm^2$ to 8000 $mm^2$.

In the honeycomb structure 1, the shape of the cells 16 in the cross section perpendicular to the cell 16 extending direction is preferably a round shape, an oval shape, a quadrilateral shape, a hexagonal shape or an octagonal shape, or a combination of these shapes. Forming the shape of the cell in this way decreases the pressure loss when flowing the exhaust gas in the honeycomb structure 1 and makes it possible to efficiently hydrolyze the urea. In the honeycomb structure 1 shown in FIG. 2, the shape of the cells 16 in the cross section (the first end face) perpendicular to the cell 16 extending direction is a round shape.

Each of the pair of electrode members 12 and 12 is formed in a band shape extending in the cell 16 extending direction of the honeycomb structure body 11. Further, the electrode member 12 is preferably formed in a wider width expanding also in a circumferential direction of the honeycomb structure body 11. In the cross section perpendicular to the cell 16 extending direction, one electrode member 12 is arranged in the opposite side with respect to the other electrode member 12 with a center of the honeycomb structure body 11 sandwiched. This can reduce deviation of a current flowing inside the honeycomb structure body 11 when a voltage is applied between the pair of electrode members 12 and 12. Then, this can reduce variation of heat generation inside the honeycomb structure body 11.

In the honeycomb structure 1, the main component of the electrode member 12 is preferably the same as the main component of the partition wall 15 and the circumferential wall 17.

The electrical resistivity of the electrode member 12 is preferably from 0.0001 Ωcm to 100 Ωcm, and further preferably from 0.001 Ωcm to 50 Ωcm. By setting a range of the electrical resistivity of the electrode member 12 as just described, the pair of electrode members 12 and 12 effectively performs a function as electrodes inside the pipe where the high temperature exhaust gas flows. In the honeycomb structure 1, the electrical resistivity of the electrode member 12 is preferably lower than the electrical resistivity of the honeycomb structure body 11. The electrical resistivity of the electrode member 12 is the value at 25° C. Also, the electrical resistivity of the electrode member 12 is the value measured by a four-terminal method.

In each of the electrode members 12 and 12, an electrode terminal projecting portion 18 for connection with electrical wiring from outside may be arranged, respectively. The material of the electrode terminal projecting portion 18 may be a conductive ceramic or metal. The material of the electrode terminal projecting portion 18 is preferably the same as that of the electrode member 12. Also, the electrode terminal projecting portion 18 and the connector 6 of the outer cylinder 4 are preferably connected by electrical wiring 7.

It is preferable that a urea hydrolysis catalyst 40 is provided in the honeycomb structure 1 (honeycomb structure body 11). Thereby, ammonia can be efficiently generated from urea. As the urea hydrolysis catalyst 40, copper zeolite, aluminum oxide and the like can be included.

(1-2) Urea Spraying Device:

The urea spraying device 2 is preferably a solenoid type, an ultrasonic type, a piezoelectric actuator type, or an atomizer type. By using these types, the urea water solution can be sprayed in mist form. Among these types, use of the solenoid type, the ultrasonic type, or the piezoelectric actuator type makes it possible to spray the urea water solution in mist form without use of air. Accordingly, the honeycomb structure 1 does not need to heat even the air used for the urea injection and can reduce an energy amount for heating. Furthermore, a reduction of an injection volume due to no injection air allows decreasing a speed at which "the urea water solution in mist form" passes through the honeycomb structure 1, and thus this ensures having a longer reaction time necessary for hydrolysis. A size (diameter) of droplets of the urea water solution sprayed from the urea spraying device 2 is preferably 0.3 mm or less. When the size of droplets is larger than 0.3 mm, the droplets may be less likely to evaporate when they receive heat from the honeycomb structure 1.

A urea spraying device 2 of a solenoid type is a device that sprays a urea water solution in mist form by "vibration of a solenoid" or "forward and backward movement of a piston due to an electric field when a solenoid is used".

A urea spraying device 2 of an ultrasonic type is a device that sprays a urea water solution in mist form by an ultrasonic vibration.

A urea spraying device 2 of a piezoelectric actuator type is a device that sprays a urea water solution in mist form by a vibration of a piezoelectric element.

A urea spraying device 2 of an atomizer type is, for example, a device that, while drawing up a fluid by a tube, blows off "the fluid drawn up in an open end at a distal end of this tube" in mist form by air, and sprays this fluid. Also, a urea spraying device 2 of an atomizer type may be even a device that sprays a fluid in mist form from a plurality of small open ends formed at a distal end of a nozzle of the device.

In the reducing agent injection device 100 of the embodiment, the urea water solution is preferably sprayed toward the first end face 13 of the honeycomb structure 1 from the urea spraying device 2. That is, in the urea spraying device 2, a spraying direction (ejected direction of droplets) of the urea water solution preferably faces to the first end face 13 of the honeycomb structure 1.

(2) Manufacturing Method of Reducing Agent Injection Device:

(2-1) Manufacturing of Honeycomb Structure:

When the honeycomb structure 1 is made of ceramic, the manufacturing method of the honeycomb structure 1 is preferably the manufacturing method described as follows. The manufacturing method of the honeycomb structure 1 preferably includes a honeycomb formed body forming process, a dried honeycomb body forming process, an unfired electrode provided honeycomb body forming process, and a honeycomb structure forming process.

(2-1-1) Honeycomb Formed Body Forming Process:

In the honeycomb formed body forming process, the honeycomb formed body is preferably formed by extrusion of the forming raw material. The forming raw material is preferably a raw material containing a ceramic raw material and an organic binder. In the forming raw material, a surfactant, a sintering additive, a pore former, water and the like besides a ceramic raw material and an organic binder are preferably contained. The forming raw material can be prepared by mixture of these raw materials.

The ceramic raw material in the forming raw material is "ceramic" or "a raw material which becomes ceramic by firing." The ceramic raw material becomes ceramic after firing in both cases. The ceramic raw material in the forming raw material preferably contains metal silicon and silicon carbide particles (silicon carbide powder) as main components or silicon carbide particles (silicon carbide powder) as a main component. Accordingly, the obtained honeycomb structure 1 exhibits electrical conductivity. Metal silicon is also preferably metal silicon particles (metal silicon powder). Also, "containing metal silicon and the silicon carbide particles as main components" means that a total mass of the metal silicon and silicon carbide particles is 90% by mass or more of the whole material (ceramic raw material). Moreover, as components contained in the ceramic raw material other than main component, $SiO_2$, $SrCO_3$, $Al_2O_3$, $MgCO_3$, cordierite and the like can be included.

When silicon carbide is used as the main component of the ceramic raw material, the silicon carbide is sintered by firing. Also, when metal silicon and silicon carbide particles are used as the main component of the ceramic raw material, the silicon carbide as aggregates can be bonded together by firing with metal silicon used as a bonding material.

When silicon carbide particles (silicon carbide powder) and metal silicon particles (metal silicon powder) are used as the ceramic raw material, the mass of the metal silicon particles is preferably from 10% by mass to 40% by mass with respect to the total of the mass of the silicon carbide particles and the mass of the metal silicon particles. The average particle diameter of the silicon carbide particles is preferably from 10 μm to 50 μm, and further preferably from 15 μm to 35 μm. The average particle diameter of the metal silicon particles is preferably from 0.1 μm to 20 μm, and further preferably from 1 μm to 10 μm. The average particle diameters of the silicon carbide particles and metal silicon particles are values measured by a laser diffraction method.

As the organic binder, methyl cellulose, glycerin, hydroxypropyl methyl cellulose and the like can be included. As the organic binder, one kind of organic binder may be used, and plural kinds of organic binders may be used. The content of the organic binder is preferably from 5 parts by mass to 10 parts by mass when the total mass of the ceramic raw material is 100 parts by mass.

As the surfactant, ethylene glycol, dextrin and the like can be used. As the surfactant, one kind of surfactant may be used, and plural kinds of surfactants may be used. The content of the surfactant is preferably from 0.1 parts by mass to 2.0 parts by mass when the total mass of the ceramic raw material is 100 parts by mass.

As the sintering additive, $SiO_2$, $SrCO_3$, $Al_2O_3$, $MgCO_3$, cordierite and the like can be used. As the sintering additive, one kind of sintering additive may be used, and plural kinds of sintering additives may be used. The content of the sintering additive is preferably from 0.1 parts by mass to 3 parts by mass when the total mass of the ceramic raw material is 100 parts by mass.

The pore former is not especially limited as long as it forms pores after firing, and, for example, graphite, starch, a foamable resin, a water absorbable resin, silica gel and the like can be included as the pore former. As the pore former, one kind of pore former may be used, and plural kinds of pore formers may be used. The content of the pore former is preferably from 0.5 parts by mass to 10 parts by mass when the total mass of the ceramic raw material is 100 parts by mass.

The content of water is preferably 20 parts by mass to 60 parts by mass when the total mass of the ceramic raw material is 100 parts by mass.

When extruding the forming raw material, first, the forming raw material is preferably kneaded to form a kneaded material.

Next, the kneaded material is preferably extruded to form the honeycomb formed body. The honeycomb formed body has porous partition walls 15 defining and forming "a plurality of cells which is through channels of a fluid and extends from a first end face being an end face on an inflow side of the fluid to a second end face being an end face on an outflow side of the fluid". The honeycomb formed body formed to have a circumferential wall positioned in an outermost circumference is also a preferable aspect. The partition wall of the honeycomb formed body is an undried and unfired partition wall.

(2-1-2) Dried Honeycomb Body Forming Process:

The dried honeycomb body forming process is preferably a process to dry the obtained honeycomb formed body and form a dried honeycomb body. A drying condition is not especially limited, and a known condition can be used. It is preferable, for example, to dry for 0.5 hours to 5 hours at 80° C. to 120° C.

(2-1-3) Unfired Electrode Provided Honeycomb Body Forming Process:

In the unfired electrode provided honeycomb body forming process, slurry for electrode formation containing the ceramic raw material and water is preferably applied over the side surface of the dried honeycomb body. Thereafter, the slurry for electrode formation is preferably dried to form an unfired electrode and form an unfired electrode provided honeycomb body.

In the unfired electrode provided honeycomb body, the unfired electrode having rectangular shape with a wider width, which extends to the cell extending direction in a band shape and expands also in a circumferential direction, is preferably formed to the dried honeycomb body. The circumferential direction is a direction along the side surface of the dried honeycomb body in a cross section perpendicular to the cell extending direction.

The slurry for electrode formation used in the unfired electrode provided honeycomb body forming process contains the ceramic raw material and water, and preferably contains the surfactant, the pore former, water and the like, besides these materials.

As the ceramic raw material, it is preferable to use the ceramic raw material used when the honeycomb formed body is formed. For example, when the main components of the ceramic raw material used when the honeycomb formed body is formed are silicon carbide particles and metal silicon, the silicon carbide particles and metal silicon are preferably used also as the ceramic raw material of the slurry for electrode formation.

The method to apply the slurry for electrode formation over the side surface of the dried honeycomb body is not especially limited. For example, the method to apply by use of a brush or a printing technique can be employed.

Viscosity of the slurry for electrode formation is preferably 500 Pa·s or less, and further preferably 10 Pa·s to 200 Pa·s, at 20° C. The viscosity exceeding 500 Pa·s may make it difficult to apply the slurry for electrode formation over the side surface of the dried honeycomb body.

After application of the slurry for electrode formation to the dried honeycomb body, the slurry for electrode formation is preferably dried to form the unfired electrode (unfired electrode provided honeycomb body). The drying temperature is preferably 80° C. to 120° C. The drying time is preferably 0.1 hours to 5 hours.

Next, a urea hydrolysis catalyst 40 is loaded onto the honeycomb structure 1. As the urea hydrolysis catalyst 40, for example, aluminum oxide can be used. As the method of loading the urea hydrolysis catalyst 40 onto a partition wall 15 of the honeycomb structure 1, for example, the honeycomb structure 1 is immersed in a container in which slurry of the urea hydrolysis catalyst 40 is stored. The viscosity of the slurry of the urea hydrolysis catalyst 40, the particle size of the contained urea hydrolysis catalyst 40 and the like are adjusted, whereby the catalyst can be loaded onto not only the surface of the partition wall 15, but also the inside of pores of the partition wall 15, and further, the amount of the loaded catalyst can be also adjusted. Also, aspiration of slurry is performed a plurality of times, whereby the amount of the loaded catalyst can be also adjusted.

(2-1-4) Honeycomb Structure Forming Process:

The honeycomb structure forming process is a process to form a honeycomb structure 1 by firing the unfired electrode provided honeycomb body.

The firing condition can be appropriately determined based on the ceramic raw material used for manufacturing of the honeycomb formed body and the kind of the ceramic raw material used for the slurry for electrode formation.

Moreover, after the unfired electrode provided honeycomb body is dried, before firing, calcination is preferably performed for reducing the binder and the like. The calcination is preferably performed for 0.5 hours to 20 hours at 400° C. to 500° C. under the air atmosphere.

(2-2) Manufacturing of Reducing Agent Injection Device:

The reducing agent injection device 100 is preferably manufactured as follows: a connector connecting electrical wiring from outside is mounted on the outer cylinder 4, and then the honeycomb structure 1 and the urea spraying device 2 are housed and secured in the outer cylinder 4.

The outer cylinder 4 is preferably formed by forming a material, such as stainless steel, in a tubular shape. The honeycomb structure 1 is preferably secured inside the outer cylinder 4 by the insulation supporting portion. Also, when there is a portion (space) where the insulation supporting portion between the honeycomb structure 1 and the outer cylinder 4 is not arranged, it is preferable to fill it with an insulating member.

(3) Method for Using Reducing Agent Injection Device:

The following describes a method for using the reducing agent injection device 100 (see FIG. 1) of the embodiment.

The reducing agent injection device 100, when a urea water solution is supplied, can hydrolyze urea in the supplied urea water solution, and inject ammonia. The urea water solution is a raw material for generation of ammonia. Further, specifically, after energizing the honeycomb structure 1 to raise its temperature (heating) and supplying the urea water solution to the urea spraying device 2, the urea water solution in mist form is preferably sprayed into the urea spraying space 3 from the urea spraying device 2. When the urea water solution is sprayed from the urea spraying device 2, the urea water solution is preferably sprayed toward the first end face 13 of the honeycomb structure 1. Then, the urea water solution in mist form (the urea water solution a sprayed from the urea spraying device 2) sprayed into the urea spraying space 3 is heated by the honeycomb structure 1 and evaporates. Because the pressure inside the urea spraying space 3 increases due to evaporation of the urea water solution, urea and water enter into the cell 16 of the honeycomb structure 1 from the first end face 13. The urea supplied into the cell 16 is hydrolyzed by the temperature of the heated honeycomb structure 1, and ammonia b is generated.

The supply amount of the urea water solution is preferably 1.0 to 2.0 in terms of an equivalence ratio with respect to the amount of nitrogen oxides contained in the exhaust gas. When the supply amount of the urea water solution is 1.0 or less in terms of the equivalence ratio, the amount of nitrogen oxide discharged without being purified may increase. When the supply amount of the urea water solution exceeds 2.0 in terms of the equivalence ratio, it may be more likely that the exhaust gas is discharged with ammonia mixed in the exhaust gas.

The urea water solution is preferably the urea water solution of 10% by mass to 40% by mass. When the value is lower than 10% by mass, because a large amount of urea water is required to be injected for $NO_X$ reduction, the amount of electric power used in a honeycomb heater may increase. When the value is higher than 40% by mass, there is a concern that urea solidifies in cold region. In the most preferable example, AdBlue (32.5% by mass urea water solution) widely distributed on the market is used.

The temperature of the honeycomb structure 1 is preferably 160° C. or more, further preferably 160° C. to 600° C., and especially preferably 160° C. to 400° C. When the temperature is lower than 160° C., it may be difficult to hydrolyze urea. When the temperature is higher than 600° C., ammonia is burnt, and ammonia may not be supplied to the exhaust pipe. Also, the temperature of the honeycomb structure 1 is preferably 360° C. or more in that a sulfur compound, such as ammonium hydrogen sulfate and ammonium sulfate, which deposits in the reducing agent injection device 100 can be removed.

The maximum voltage to be applied to the honeycomb structure 1 is preferably 12 V to 200 V, further preferably 12 V to 100 V, and especially preferably 12 V to 48 V. When the maximum voltage is lower than 12 V, it may be difficult to raise the temperature of the honeycomb structure 1. The maximum voltage higher than 200 V requires a more expensive voltage booster and is not preferable.

Figure 3:
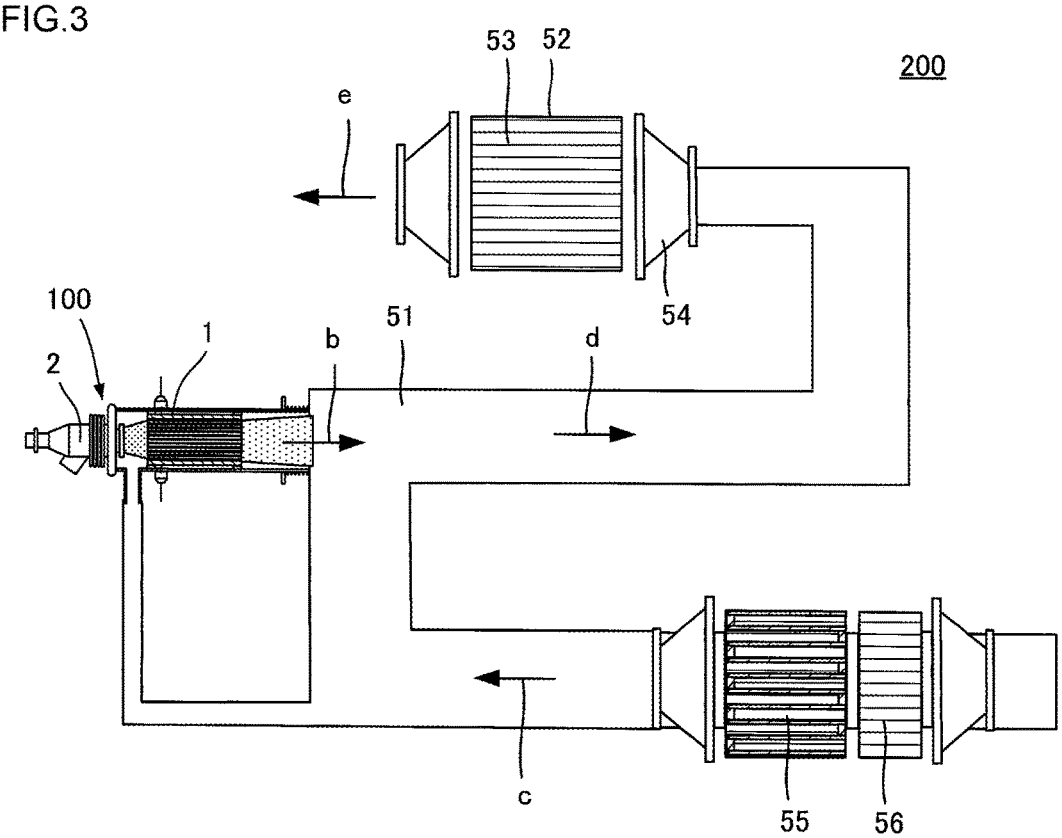
FIG. 3 is a schematic diagram showing a cross section of one embodiment of an exhaust gas treatment device of the present invention.

(4) Exhaust Gas Treatment Device:

One embodiment (exhaust gas treatment device 200) of the exhaust gas treatment device of the present invention includes, as shown in FIG. 3, an exhaust pipe 51, a reducing agent injection device 100, an SCR catalyst 52 arranged on "the downstream side of the exhaust pipe 51 with respect to the position where ammonia is injected." The reducing agent injection device 100 injects ammonia into the exhaust pipe 51. The exhaust pipe 51 is a pipe that flows "an exhaust gas c containing $NO_X$."

The exhaust pipe 51 is a pipe passing the exhaust gas (the exhaust gas c containing $NO_X$) discharged from various kinds of engines, and the exhaust gas and ammonia are mixed in the exhaust pipe 51. The size of the exhaust pipe 51 is not especially limited and can be appropriately determined in accordance with an exhaust system of an engine and the like where the exhaust gas treatment device 200 of the embodiment is mounted. Though the length in the gas flowing direction in the exhaust pipe 51 is not especially limited, it is preferable for the length to make a distance between the reducing agent injection device 100 and the SCR catalyst 52 an appropriate distance.

Though the material of the exhaust pipe 51 is not especially limited, a material where corrosion by the exhaust gas is less likely to occur is preferable. As the material of the exhaust pipe 51, for example, stainless steel and the like are preferable.

The reducing agent injection device 100 is a reducing agent injection device of the present invention. The reducing agent injection device 100 is mounted to the exhaust pipe 51 and injects ammonia into the exhaust pipe 51. By injection of ammonia into the exhaust pipe 51 from the reducing agent injection device 100, a mixed gas d of ammonia and the exhaust gas is generated in the exhaust pipe 51.

The exhaust gas treatment device 200 of the embodiment includes the SCR catalyst 52 arranged on "the downstream side of the exhaust pipe 51 with respect to the position where ammonia is injected." The SCR catalyst 52 is preferably arranged on the downstream side of the exhaust pipe 51 in a state of catalyzer 53 (SCR catalyst 52 loaded onto the ceramic honeycomb structure).

As the SCR catalyst 52, specifically, a vanadium-based catalyst, a zeolite-based catalyst and the like can be included.

When the SCR catalyst 52 is used as a catalyzer 53 loaded onto the honeycomb structure, the catalyzer 53 is housed in a storing container 54, and the storing container 54 is preferably mounted on the downstream side of the exhaust pipe 51.

The honeycomb structure 1 loading the SCR catalyst 52 is not especially limited, and a honeycomb structure known as "a ceramic honeycomb structure loading an SCR catalyst" can be used.

In an upstream side of the exhaust pipe 51, a filter for trapping particulate matter in the exhaust gas is preferably arranged. As the filter for trapping a particulate matter, for example, a honeycomb-shaped ceramic diesel particulate filter (DPF) 55 can be included. Also, in the upstream side of the exhaust pipe 51, an oxidation catalyst 56 for removing hydrocarbon and carbon monoxide in the exhaust gas is preferably arranged. The oxidation catalyst is preferably in a state of being loaded onto the ceramic honeycomb structure (oxidation catalyzer). As the oxidation catalyst, noble metals such as platinum (Pt), palladium (Pd), and rhodium (Rh) are suitably used.

On the downstream side of the SCR catalyst 52, an ammonia removal catalyst (oxidation catalyst) for removing ammonia is preferably arranged. This prevents ammonia from being discharged outside when extra ammonia not used for removal of $NO_X$ in the exhaust gas flows on the downstream side. As the oxidation catalyst, noble metals such as platinum (Pt), palladium (Pd), and rhodium (Rh) are suitably used.

(5) Exhaust Gas Treatment Method:

One embodiment of an exhaust gas treatment method of the present invention is a method that flows the exhaust gas c into the exhaust pipe 51, injects the ammonia b into the exhaust gas c, and performs a reduction treatment of the mixed gas by the SCR catalyst 52, by using the one embodiment (exhaust gas treatment device 200) of the present invention shown in FIG. 3. This allows an exhaust gas e after $NO_X$ removal to be obtained. The above-described exhaust gas c contains $NO_X$. The above-described mixed gas is "the exhaust gas with ammonia being mixed," and is the mixed gas d of ammonia and the exhaust gas. The ammonia b is injected by the reducing agent injection device 100.

An injection amount of ammonia injected from the reducing agent injection device 100 is preferably 1.0 to 2.0 in terms of the equivalence ratio with respect to the amount of nitrogen oxide contained in the exhaust gas. When the injection amount of ammonia is less than 1.0 in terms of the equivalence ratio, the amount of nitrogen oxide discharged without being purified may increase. When the injection amount of ammonia exceeds 2.0 in terms of the equivalence ratio, it may be more likely that the exhaust gas is discharged with ammonia mixed in the exhaust gas.

The spraying amount of the urea water solution and the temperature (applied voltage) of the honeycomb structure 1 are preferably controlled by the electronic control device. Preferably, the temperature of the honeycomb structure 1 is calculated from the resistance value of the honeycomb structure 1 and is controlled such that the calculated temperature becomes desired temperature.

EXAMPLES

The following describes the present invention more specifically with examples, but the present invention is not limited to these examples.

Example 1

A reducing agent injection device 100 as shown in FIG. 1 was manufactured. It is specifically described as follows. First, a honeycomb structure 1 was prepared.

The silicon carbide (SiC) powder and metal silicon (Si) powder were mixed in a mass ratio of 70:30 to prepare a ceramic raw material. Then, hydroxypropyl methyl cellulose as a binder and a water absorbable resin as a pore former were added to the ceramic raw material, and water was added together to prepare a forming raw material. Then, the forming raw material was kneaded by a vacuum pugmill to form a round pillar-shaped kneaded material. The content of the binder was 7 parts by mass when the ceramic raw material was 100 parts by mass. The content of the pore former was 3 parts by mass when the ceramic raw material was 100 parts by mass. The content of water was 42 parts by mass when the ceramic raw material was 100 parts by mass. The average particle diameter of the silicon carbide powder was 20 μm, and the average particle diameter of the metal silicon powder was 6 μm. The average particle diameter of the pore former was 20 μm. The average particle diameters of the silicon carbide, the metal silicon and the pore former were the values measured by laser diffraction method.

The obtained round pillar-shaped kneaded material was formed using an extruder to obtain a square pillar-shaped (a pillar shape in which cross section perpendicular to the cell extending direction is square) honeycomb formed body. After the obtained honeycomb formed body was dried by high frequency dielectric heating, the obtained honeycomb formed body was dried at 120° C. for 2 hours by use of a hot-air drying machine, and both end faces were cut as much as predetermined amounts.

Next, the silicon carbide (SiC) powder and metal silicon (Si) powder were mixed in the mass ratio of 60:40 to prepare the ceramic raw material for the electrode member. Then, hydroxypropyl methyl cellulose as the binder, glycerin as a moisturizing agent, and a surfactant as a dispersing agent were added to the ceramic raw material for the electrode member, and water was added together to mix. The mixture was kneaded to prepare an electrode member forming raw material.

Next, the electrode member forming raw material was applied in a band shape over two parallel surfaces in the side surfaces of the dried honeycomb formed body. The electrode member forming raw material was applied in a band shape over one side surface among "the side surfaces (four side surfaces) having four planes" of the dried honeycomb formed body, and was also applied in a band shape over one side surface parallel to this "applied side surface." The shape (circumference shape) of the electrode member forming raw material applied over the side surface of the honeycomb formed body was a rectangular shape.

Next, the electrode member forming raw material applied to the honeycomb formed body was dried. The drying condition was 70° C.

Next, by using the same material as an electrode forming material, an electrode terminal projecting portion forming member was obtained.

Next, each of two electrode terminal projecting portion forming members was laminated to the respective portions, where the electrode member forming raw material was applied, of two places of the honeycomb formed body, respectively. Afterwards, the honeycomb formed body was degreased, fired, and further underwent oxidation treatment to obtain the honeycomb structure 1. The degreasing condition was set at 550° C. for 3 hours. The firing condition was set at 1,450° C. for 2 hours, under the argon atmosphere. The oxidation treatment condition was set at 1,300° C. for 1 hour.

The thickness (rib thickness) of the partition walls 15 of the obtained honeycomb structure 1 was 0.127 mm (5 mil), and the cell pitch was 1.037 mm. Also, the hydraulic diameter was 0.91 mm. The shape of the honeycomb structure 1 was a pillar shape with a square bottom surface. One side of the bottom surface of the honeycomb structure 1 was 30 mm. The length in the cell extending direction of the honeycomb structure 1 was 25 mm. The electrical resistivity of the electrode member was 0.1 Ωcm, and the electrical resistivity of the honeycomb structure body 11 was 1.4 Ωcm.

Furthermore, copper zeolite was loaded onto the honeycomb structure 1 as a urea hydrolysis catalyst.

An outer cylinder 4 was formed with a stainless steel. In the outer circumference of the outer cylinder 4, two connectors for electrical wiring were mounted. The honeycomb structure 1 was inserted into the outer cylinder 4 and secured by an insulation supporting member. Then, the electrode terminal projecting portions of the honeycomb structure 1 were connected to the connectors in the outer cylinder 4 by electrical wiring. A urea spraying device 2 of a solenoid type was mounted inside the inlet side end portion of the outer cylinder 4 to obtain a reducing agent injection device 100.

Examples 2 to 6, Comparative Examples 1 to 5

Also as to Examples 2 to 6 and Comparative Examples 1 to 5, a honeycomb structure 1 was prepared in the same manner as Example 1. The size is shown in Table 1.

The reducing agent injection device 100 as shown in FIG. 1 was manufactured, and the honeycomb structure 1 was energized to generate ammonia, then the generation amount of ammonia and the presence or absence of the generation of deposit were investigated. In addition, also for the case where the honeycomb structure 1 was not energized, the presence or absence of the generation of deposit was investigated. Deposit was investigated after performing an experiment for 30 minutes with an amount of urea added of 3.0 g/min. The case where deposit was not generated is shown by A, and the case where deposit was generated is shown by B, and the experiment result is shown in Table 1. As to the generation amount of ammonia, $NH_3$ concentration in an injection port 23 of the reducing agent injection device 100 was measured using an FTIR gas analyzer. As to the generation of deposit, the first end face 13 of the honeycomb structure 1 was visually observed, and judged the presence or absence of deposit. Also, as to the inside of the honeycomb structure 1, the presence or absence of deposit was determined by X-ray CT (Computed Tomography) observation.

TABLE 1

| | Heater cell structure | | | | | | | | Result | | |
|---|---|---|---|---|---|---|---|---|---|---|---|
| | Amount of urea added (g/min) | Rib thickness (mil) | Number of cells (cpsi) | OFA (%) | Cell pitch (mm) | Cell opening width (mm) | Hydraulic diameter (mm) | Electric power (W) | Energized Deposit | Generation amount of $NH_3$ (ppm) | Not energized Deposit |
| Comparative Example 1 | 3 | 5 | 400 | 81 | 1.27 | 1.143 | 1.143 | 400 | B | 620 | A |
| Example 1 | 3 | 5 | 600 | 77 | 1.037 | 0.91 | 0.91 | 400 | A | 650 | A |
| Comparative Example 2 | 3 | 5 | 800 | 73.7 | 0.898 | 0.771 | 0.771 | 400 | A | 650 | B |
| Example 2 | 3 | 10 | 200 | 73.7 | 1.796 | 1.542 | 1.542 | 400 | A | 600 | A |
| Example 3 | 3 | 12 | 300 | 62.8 | 1.466 | 1.162 | 1.162 | 400 | A | 620 | A |
| Comparative Example 3 | 3 | 15 | 100 | 74 | 2.729 | 2.348 | 2.348 | 400 | A | 560 | A |
| Example 4 | 3 | 15 | 150 | 66.6 | 2.074 | 1.693 | 1.693 | 400 | A | 600 | A |
| Example 5 | 3 | 15 | 200 | 62.1 | 1.796 | 1.415 | 1.415 | 400 | A | 610 | A |
| Example 6 | 3 | 15 | 300 | 54.8 | 1.466 | 1.085 | 1.085 | 400 | A | 620 | A |
| Comparative Example 4 | 3 | 20 | 300 | 42.7 | 1.466 | 0.958 | 0.958 | 400 | B | 650 | A |
| Comparative Example 5 | 3 | 20 | 300 | 42.7 | 1.466 | 0.958 | 0.958 | 500 | B | 650 | A |

The hydraulic diameter HD of the honeycomb structure 1 is 0.8 to 2.0 mm, and deposit was not generated in Examples 1 to 6 in which the open frontal area OFA was 45 to 80%. On the other hand, deposit was generated when energized in Comparative Examples 1, 4 and 5 in which the open frontal area OFA was out of 45 to 80%. Deposit was generated when not energized in Comparative Example 2 in which the hydraulic diameter HD was out of 0.8 to 2.0 mm. The urea decomposition efficiency was lowered in Comparative Example 3 in which the hydraulic diameter HD was out of 0.8 to 2.0 mm.

The reducing agent injection device and exhaust gas treatment device of the present invention can be suitably used to purify nitrogen oxides ($NO_X$) in an exhaust gas discharged from various kinds of engines and the like.

DESCRIPTION OF REFERENCE NUMERALS

1: honeycomb structure, 2: urea spraying device, 3: urea spraying space, 4: outer cylinder, 5: insulation supporting portion, 6: connector, 7: electrical wiring, 11: honeycomb structure body, 12: electrode member, 13: first end face, 14: second end face, 15: partition wall, 16: cell, 17: circumferential wall, 18: electrode terminal projecting portion, 21: inlet side end portion (of outer cylinder), 22: outlet side end portion (of outer cylinder), 23: injection port, 40: urea hydrolysis catalyst, 51: exhaust pipe, 52: SCR catalyst, 53: catalyzer, 54: storing container, 55: DPF, 56: oxidation catalyst, 100: reducing agent injection device, 200: exhaust gas treatment device, a: urea water solution sprayed from urea spraying device, b: ammonia, c: exhaust gas, d: mixed gas of ammonia and exhaust gas, e: exhaust gas after removal of $NO_X$

What is claimed is:
1. A reducing agent injection device, comprising:
   a honeycomb structure that has an electrically heated pillar-shaped honeycomb structure body having partition walls defining and forming a plurality of cells which is through channels of a fluid and extends from a first end face being an end face on an inflow side of the fluid to a second end face being an end face on an outflow side of the fluid, and that has at least a pair of electrode members arranged in a side surface of the electrically heated pillar-shaped honeycomb structure body; and a urea spraying device that sprays a urea water solution in mist form, wherein each of the pair of electrode members is formed in a band shape extending to a cell extending direction of the electrically heated pillar-shaped honeycomb structure body, and, in the cross section perpendicular to the cell extending direction, one electrode member of the pair of electrode members is arranged on an opposite side of the other electrode member of the pair of electrode members with respect to a center of the electrically heated pillar-shaped honeycomb structure body sandwiched by the pair of electrode members, the hydraulic diameter HD, defined as HD=4×S/C, when the area of the cross section of one of the cells in the cross section perpendicular to the cell extending direction is S, and the peripheral length of the cross section of one of the cells is C, is 0.8 to 2.0 mm, the open frontal area OFA of the honeycomb structure in the cross section perpendicular to the cell extending direction is 45 to 80%, and the urea water solution sprayed from the urea spraying device is supplied into the cells from the first end face of the electrically heated pillar-shaped honeycomb structure body, and urea in the urea water solution supplied into the cells is heated and hydrolyzed in the electrically heated pillar-shaped honeycomb structure body to generate ammonia, and the ammonia is discharged outside the electrically heated pillar-shaped honeycomb structure body from the second end face and is ejected outside.

2. An exhaust gas treatment device, comprising:

an exhaust pipe that flows an exhaust gas containing $NO_X$;

the reducing agent injection device as defined in claim 1 that injects the ammonia into the exhaust pipe; and an SCR catalyst arranged on a downstream side of the exhaust pipe with respect to a position where the ammonia is injected.

\* \* \* \* \*